(12) United States Patent
Lo

(10) Patent No.: US 8,306,580 B2
(45) Date of Patent: Nov. 6, 2012

(54) MOTION SENSOR ASSISTED AUTO-SHUTDOWN MECHANISM IN PORTABLE AUDIO SYSTEMS

(75) Inventor: Weng Chew Lo, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 593 days.

(21) Appl. No.: 12/276,720

(22) Filed: Nov. 24, 2008

(65) Prior Publication Data
US 2010/0131788 A1 May 27, 2010

(51) Int. Cl.
*H04M 1/00* (2006.01)
*H04B 1/04* (2006.01)
*G06F 1/32* (2006.01)

(52) U.S. Cl. ............. 455/574; 455/127.5; 713/320

(58) Field of Classification Search ............ 455/127.5, 455/574; 713/300–340
See application file for complete search history.

(56) References Cited

U.S. PATENT DOCUMENTS

| | | |
|---|---|---|
| 4,341,364 A | 7/1982 | Maddaloni |
| 4,727,240 A | 2/1988 | Provolo et al. |
| 5,642,104 A | 6/1997 | Erwin |
| 6,259,486 B1 | 7/2001 | Mahvi |
| 7,084,762 B2 | 8/2006 | Pedrazzini et al. |
| 7,136,680 B2 | 11/2006 | Leizerovich et al. |
| 7,769,415 B2 * | 8/2010 | Vuong et al. ............ 455/574 |
| 7,826,818 B2 * | 11/2010 | Gollnick et al. ......... 455/343.4 |
| 2002/0084334 A1 | 7/2002 | Zhang |
| 2005/0088120 A1 | 4/2005 | Avis |
| 2006/0285330 A1 | 12/2006 | Sundell |
| 2007/0241888 A1 * | 10/2007 | Mantovani et al. ...... 340/539.13 |
| 2007/0291974 A1 | 12/2007 | Eisenbraun |
| 2008/0182618 A1 * | 7/2008 | Gustavsson et al. ......... 455/557 |
| 2008/0225000 A1 | 9/2008 | Bellwood et al. |
| 2009/0217065 A1 * | 8/2009 | Araujo, Jr. ................... 713/320 |

\* cited by examiner

*Primary Examiner* — Matthew Sams
*Assistant Examiner* — Joel Ajayi
(74) *Attorney, Agent, or Firm* — Yee & Associates, P.C.; Steven L. Bennett

(57) ABSTRACT

A mechanism for automatically controlling the power condition of a portable audio system. The mechanism of the illustrative embodiments determines whether a user is interacting with the portable audio player. If no user interaction with the portable audio player is detected, the mechanism of the illustrative embodiments determines whether the portable audio player is moving. If the portable audio player is not moving, an inactivity duration counter in the portable audio player is incremented to an incremented value. Responsive to a determination that the incremented value of the inactivity duration counter meets or exceeds a time duration threshold value, the mechanism of the illustrative embodiments change the power condition of the portable audio player by turning the portable audio player off.

15 Claims, 3 Drawing Sheets

MOTION SENSOR ASSISTED AUTO-SHUTDOWN MECHANISM IN PORTABLE AUDIO SYSTEMS

BACKGROUND OF THE INVENTION

1. Field of the Invention

The present invention relates generally to controlling the power condition of an audio device, and more specifically to providing a motion sensor assisted auto-shutdown mechanism in a portable audio system.

2. Description of the Related Art

An audio player is an electronic device that stores, organizes, and plays recorded audio files. Personal audio devices such as portable audio players allow users to listen to recorded audio files while minimizing the impact on a user's mobility. Examples of portable electronics devices include, but are not limited to, cassette players, portable radios, Compact Disk (CD) players, and Moving Pictures Experts Group Audio Layer-3 (MP3) players.

Typically, portable devices are battery powered. A concern with a portable device such as a portable audio player is the battery life. To prolong the length of time in which the battery is operational in the portable audio device, the device may be manually turned off by the user when not in use. Some audio players comprise an auto-shutdown feature that consists of the ability to automatically shut down or turn off if the user has not physically interacted with the audio player within a certain amount of time. For example, if the user has not pushed a button on the audio player to forward to the next song or to increase the volume, etc. during a set time period, an auto-shutdown feature in the audio player will turn the player off automatically to conserve battery life. However, existing shutdown features based on user inactivity with the audio device can cause the audio player to turn itself off even though the user wants the audio player to continue playing the audio files.

BRIEF SUMMARY OF THE INVENTION

The illustrative embodiments provide a mechanism for automatically controlling the power condition of a portable audio system. The mechanism of the illustrative embodiments determines whether a user is interacting with the portable audio player. If no user interaction with the portable audio player is detected, the mechanism of the illustrative embodiments determines whether the portable audio player is moving. If the portable audio player is not moving, an inactivity duration counter in the portable audio player is incremented to an incremented value. Responsive to a determination that the incremented value of the inactivity duration counter meets or exceeds a time duration threshold value, the mechanism of the illustrative embodiments change the power condition of the portable audio player by turning the portable audio player off.

DETAILED DESCRIPTION OF THE INVENTION

Figure 1:
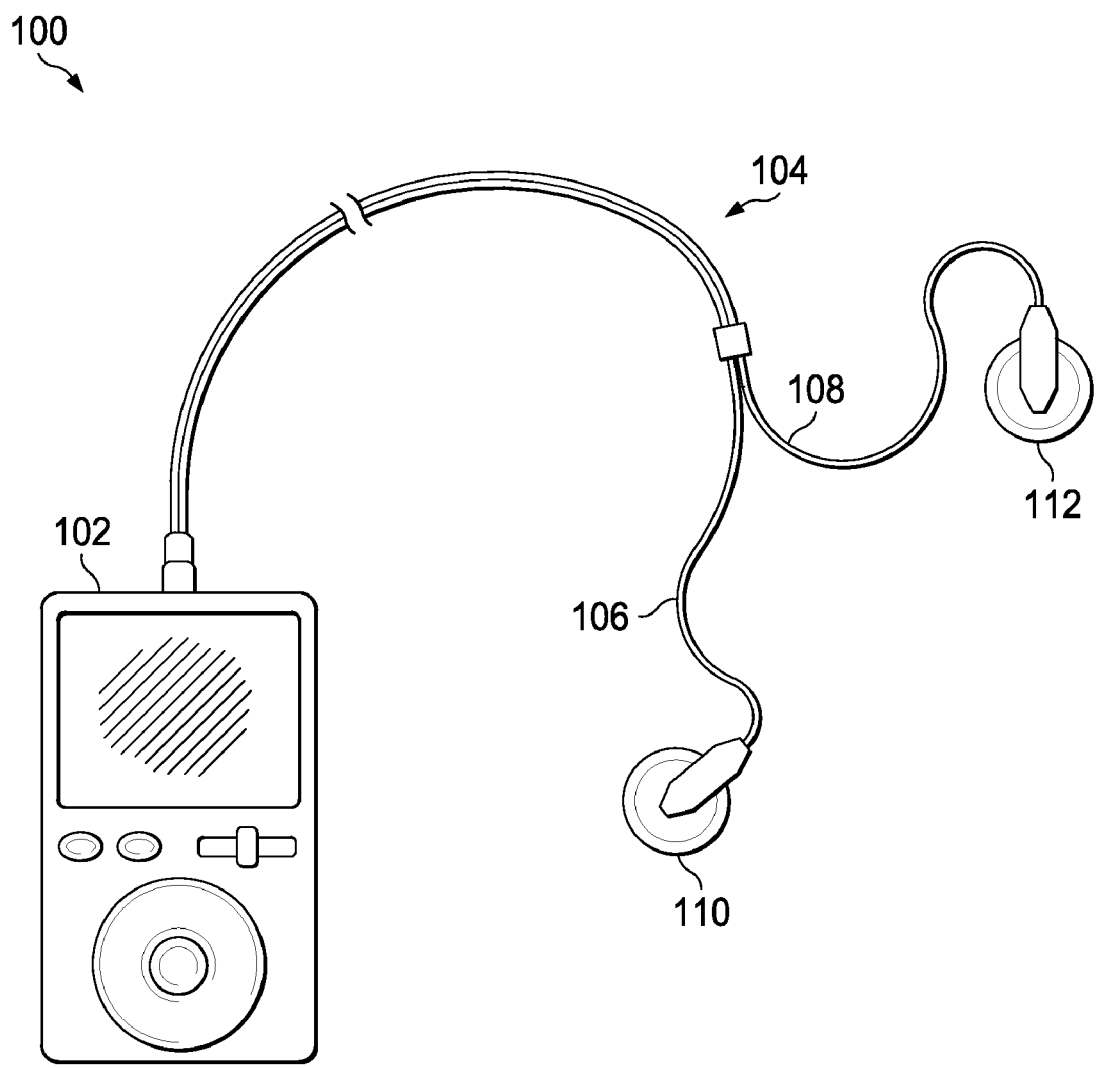
FIG. 1 depicts a pictorial representation of a portable audio system in which aspects of the illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The illustrative embodiments provide an improved audio player system for controlling and conserving the battery life of a portable audio player. The improved audio player system in the illustrative embodiments comprises a user interaction detection feature, a motion sensing feature, and an auto-shutdown feature. The user interaction detection feature allows an audio player to detect physical or voice-based interaction by the user with the audio player. If the audio player fails to detect any such interaction between the user and the audio player (e.g., the user pushing a button or moving a dial on the player) within a certain amount of time, the audio player automatically turns off or shuts down to minimize battery usage. Thus, if no interaction between the user and the audio player is detected within a set time period, the audio player automatically shuts down since the user is determined not to be currently using the audio player.

A motion sensing feature in the illustrative embodiments is used in tandem with the user interaction detection feature to detect movement of the audio player system. In many situations, when an audio player is in use, the audio player is not maintained in a stationary position. Rather, the audio player may experience movement in relation to its environment, such as when the user is walking or jogging with the audio player. When the motion sensor feature in the audio player detects movement of the audio player, the audio player may determine that the audio player is still in use, even though no physical or voice-based interaction is detected by the user interaction detection feature between the audio player and the user. Consequently, when a user carries or wears an audio player comprising the user interaction detection feature and the motion detection feature while walking or jogging, the motion sensor feature in the audio player in the illustrative embodiments may allow the audio player to continue to operate in its active (i.e., turned on) state despite the absence of interaction between the audio player and the user. The audio player uses the motion sensing feature to detect movement of the audio device in relation to its environment and, if movement is detected, determines that the audio player may remain active. However, if no movement by the audio player is detected within a set amount of time, the auto-shutdown feature in the audio player automatically turns off the audio player to conserve battery life. Thus, with a combination of a user interaction detection feature and a motion sensing feature, the illustrative embodiments provide an intelligent audio player capable of conserving battery life by automatically shutting down when certain inactivity time thresholds are met, while still preventing the audio player from being inadvertently shut down if specific conditions (either user interaction or movement is detected within a set time period) that indicates that the audio player is still in use by the user.

With reference now to the figures and in particular with reference to FIG. 1, a pictorial representation of a portable audio system in which aspects of the illustrative embodiments may be implemented is depicted. Portable audio system 100 is a compact audio system that allows a user to listen to an audio device. Portable audio system 100 may include any electronic audio device that is capable of being carried by a user. Portable audio system 100 may also include hand-held audio devices, such as cassette players, portable radios, and CD players. In this illustrative example, portable audio system 100 includes portable audio device 102 and earphones 104.

Portable audio device 102 is any device that reads and transmits an audio signal. Generally, audio device 102 is any device capable of reading and transmitting an audio recording, such as a compact disk (CD) player, a tape player, an MP3® player, a wireless mobile telephone, a personal digital assistant (PDA), or a digital audio player. (MP3® is a registered trademark of Coby Electronics Corporation in the United States, other countries, or both.) Portable audio device 102 can play any type of audio or multimedia recording, such as music or an audio book. In the illustrative embodiment, portable audio device 102 is a MP3 player that plays music. Portable audio device 102 may also include a graphical user interface (GUI) that may be implemented by means of systems software residing in computer readable media in operation within audio player 102.

Portable audio device 102 is connected and transmits audio signals to earphones 104. Left wire 106 and right wire 108 transmit electrical signals from portable audio player 102 to left earpiece 110 and right earpiece 112. Left earpiece 110 and right earpiece 112 translate the electrical sounds into audio sound waves, which are then transmitted to the ears of the user. Portable audio system 100 is not limited to the example illustrative embodiment, and, in another embodiment, earphones 104 may connect to portable audio device 102 via a wireless connection. In another embodiment, portable audio device 102 may be utilized with or without earphones 104, and the audio signals may be transmitted via speakers within or connected to portable audio device 102.

Figure 2:
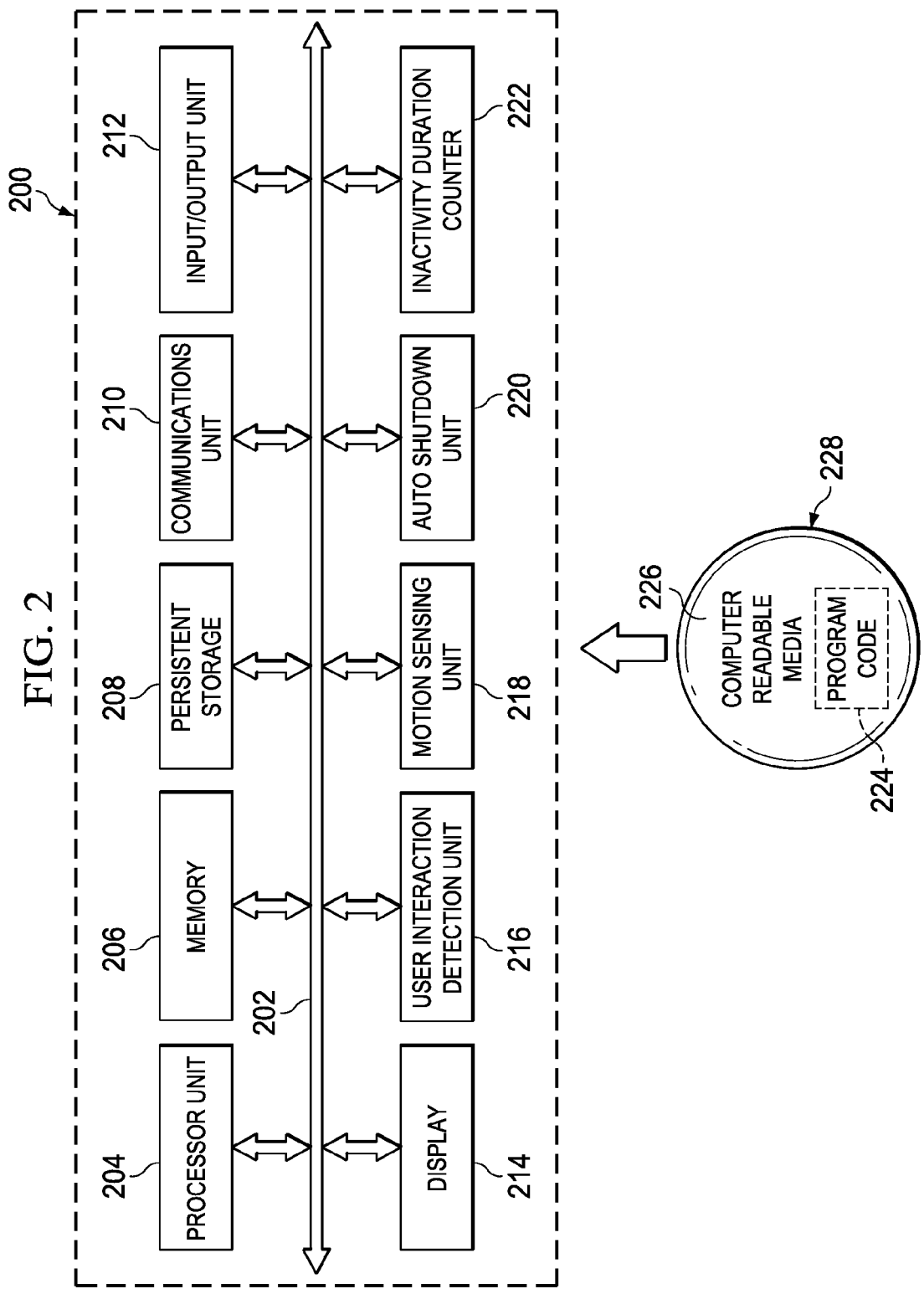
FIG. 2 depicts a block diagram of a portable audio player in which the illustrative embodiments may be implemented.

FIG. 2 depicts a block diagram of an audio player in which aspects of the illustrative embodiments may be implemented. Audio player 200 is an example of a portable audio device, such as portable audio device 102 in FIG. 1, in which code or instructions implementing the processes of the present invention may be located.

In this illustrative example, audio player 200 includes communications fabric 202, which provides communications between processor unit 204, memory 206, persistent storage 208, communications unit 210, input/output (I/O) unit 212, display 214, user interaction detection unit 216, motion sensing unit 218, auto shutdown unit 220, and inactivity duration counter 222. Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. Communications unit 210 may provide communications through the use of either or both physical and wireless communications links.

Input/output unit 212 allows for input and output of data with other devices that may be connected to audio player 200. For example, input/output unit 212 may provide a connection for user input through a keyboard and mouse. Further, input/output unit 212 may send output to a printer. Display 214 provides a mechanism to display information to a user.

Audio player 200 utilizes user interaction detection unit 216 and motion sensing unit 218 in tandem to determine whether the audio player should remain in its active or turned on state or whether the audio player should shut down to conserve battery life. User interaction detection unit 216 allows for detecting a user's interaction with audio player 200. A user interaction may include any physical or voice-based manipulation of the operation of audio player 200, such as, for example, the pushing of a button on the audio device to change the current song selection or change the volume level. User interaction detection unit 216 may include any suitable device that is capable of detecting user interaction with a portable electronic device. In one embodiment, the user interaction detection unit 216 may comprise logic for triggering an interrupt when the user interacts with the audio player 200. For example, if the user selects a button on audio player 200, the selection of the button triggers an interrupt that sets a flag in a status register in audio player 200. A status register, also known as a flag register or a condition code register, comprises a collection of flag bits and may be located in memory 206. A user interaction detected flag bit set in the status register indicates user interaction with audio player 200. User interaction with the audio player sets a user interaction detected flag in the status register to indicate that user activity with the audio player is detected.

Motion sensing unit 218 allows for detecting movement of audio player 200 in relation to the audio player's environment. Movement of a audio player 200 in relation to the audio player's environment according to the illustrative embodiments may include, but is not limited to, vibration, acceleration, or other motion along an X, Y, and/or Z axis, or any combination of the above. In one embodiment, motion sensing unit 218 may comprise a gyro motion sensor, although motion sensing unit 218 may include any known device capable of detecting movement of an object, such as accelerometers, actuators, cantilevers, electromagnetic devices, etc. A gyro sensor is a sensing device that measures rotational motion. An example of a gyro motion sensor is XV-3500CB, which is a small gyro sensor developed by Seiko Epson Corporation and NGK Insulators, Ltd. Motion sensing unit 218 may also comprise logic for triggering an interrupt when motion sensing unit 218 detects movement of audio player 200. Detection of audio player movement by motion sensing unit 218 triggers an interrupt that sets a movement detected flag in a status register in audio player 200 to indicate that movement of the audio player is detected.

Auto-shutdown unit 220 provides for the automatic shut down of audio player 200 based on detection of user inactivity with the audio player. Auto-shutdown unit 220 may be implemented entirely in hardware or software, or a combination of both. Auto-shutdown unit 220 may comprise logic that turns off audio player 200 to conserve battery life when the length of time of user inactivity meets or exceeds a specific time duration threshold. The time duration threshold is a time value indicating the maximum amount of time an absence of user activity is allowed. User inactivity is defined as including the absence of any physical or voice-based manipulation of the operation of audio player 200 by the user and/or the absence of any movement of audio player 200 in relation to the audio player's environment. In one embodiment, audio player 102 includes default settings with a preset time duration threshold for user inactivity. In another embodiment, the time duration threshold for user inactivity may be configurable by a user. For instance, the user may set the time duration threshold for 60 seconds. Thus, if no user interaction with the audio player or movement of the audio player is detected by user interaction detection unit 216 or motion sensing unit 218 within a 60 second time window, auto-shutdown unit 220 will turn off audio player 200.

Inactivity duration counter 222 is a counter indicating an interval in which no user activity with audio player 200 has been detected. Inactivity duration counter 222 may be set to an initial value (e.g., 0) when the audio player 200 is turned on. Each time user interaction detection unit 216 and motion sensing unit 218 detects an absence of user activity with audio player 200, auto-shutdown unit 220 increments the current value in inactivity duration counter 222. If either user interaction detection unit 216 or motion sensing unit 218 detects user activity with audio player 200, auto-shutdown unit 220 resets inactivity duration counter 222 back to the initial value.

Auto-shutdown unit 220 polls the status registers to determine if a flag has been set by user interaction detection unit 216 or motion sensing unit 218. The status registers may be polled by auto-shutdown unit 220 at specific intervals (e.g., 1 second) to determine if there is movement or user interaction with the audio player. If either user interaction detection unit 216 or motion sensing unit 218 has set a flag in the status registers, auto-shutdown unit 220 does not implement the auto-shutdown algorithm, but rather maintains the active state of audio player 200. Auto-shutdown unit 220 also resets the inactivity duration counter 222 (e.g., resets the counter to 0) and resets the flags in the status registers.

If neither user interaction detection unit 216 nor motion sensing unit 218 has set a flag in the status registers, auto-shutdown unit 220 increments inactivity duration counter 222. After each increment of inactivity duration counter 222, auto-shutdown unit 220 checks the current value in inactivity duration counter 222 to determine whether the current value meets or exceeds the time duration threshold. Auto-shutdown unit 220 maintains the active state of audio player 200 if the current value of inactivity duration counter 222 is less than the time period threshold. However, auto-shutdown unit 220 executes an automatic shut down of audio player 200 to conserve battery life if the current value of inactivity duration counter 222 meets or exceeds the time period threshold.

Audio player 200 may also include an interface to a user control that allows the user to control the state of auto-shutdown unit 220. The user control allows the user to enable or disable the auto-shutdown feature of auto-shutdown unit 220. The user control setting may be a binary value or a set flag that indicates whether the user has enabled or disabled the auto-shutdown feature. The auto-shutdown unit 220 may check the user control setting before implementing the auto-shutdown feature. If the auto-shutdown user control is set to 'enable', the auto-shutdown unit may shut down the audio player if no user activity is detected with the audio player. If the auto-shutdown user control is set to 'disable', the auto-shutdown unit is prevented from automatically shutting down the audio player, even in the absence of user activity detected with the audio player.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 224 is located in a functional form on computer readable media 226 that is selectively removable and may be loaded onto or transferred to audio player 200 for execution by processor unit 204. Program code 224 and computer readable media 226 form computer program product 228 in these examples. In one example, computer readable media 226 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 226 also may take the form of a persistent storage, such as a hard drive, a thumb drive, or a flash memory that is connected to audio player 200. The tangible form of computer readable media 226 is also referred to as computer recordable storage media. In some instances, computer readable media 226 may not be removable.

Alternatively, program code 224 may be transferred to audio player 200 from computer readable media 226 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 224 may be downloaded over a network to persistent storage 208 from another device or data processing system for use within audio player 200. For instance, program code stored in a computer readable storage medium in a server data processing system may be downloaded over a network from the server to audio player 200. The data processing system providing program code 224 may be a server computer, a client computer, or some other device capable of storing and transmitting program code 224.

The different components illustrated for audio player 200 are not meant to provide architectural limitations to the manner in which different embodiments may be implemented. The different illustrative embodiments may be implemented in a data processing system including components in addition to or in place of those illustrated for audio player 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in audio player 200 is any hardware apparatus that may store data. Memory 206, persistent storage 208 and computer readable media 226 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
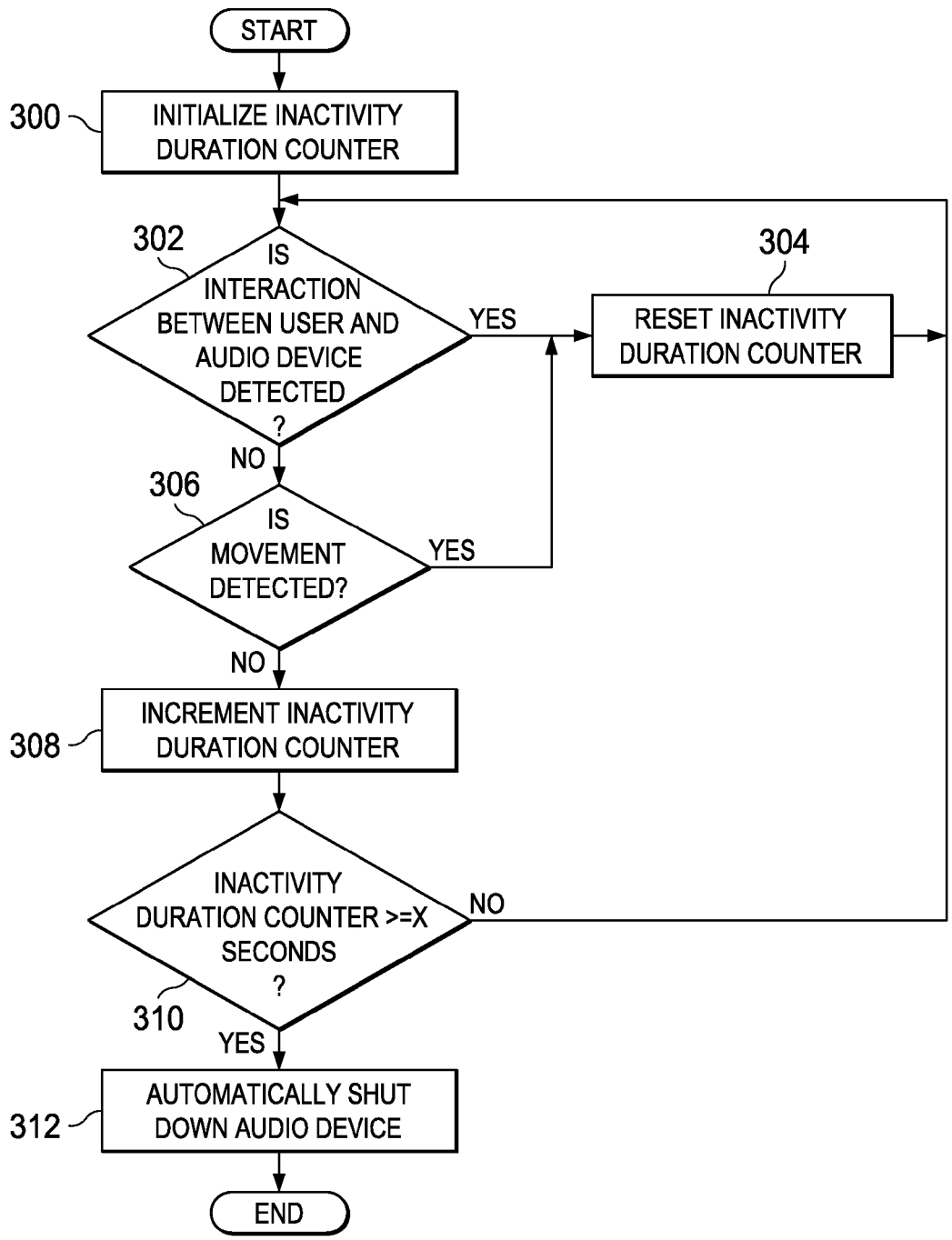
FIG. 3 is a flowchart illustrating a process for controlling the power condition of the portable audio player in accordance with aspects of the illustrative embodiments.

FIG. 3 is a flowchart illustrating a process for controlling the power condition of the portable audio player in accordance with aspects of the illustrative embodiments. The following process is exemplary only and the order of each step may be interchanged without deviating from the scope of the invention. In one embodiment, the process may be executed in an auto-shutdown unit in the portable audio player, such as auto-shutdown unit 220 in audio player 200 in FIG. 2.

The process begins with the auto-shutdown unit in a portable audio player initializing the inactivity duration counter to an initial value (step 300). The auto-shutdown unit then determines whether any interaction between the user and the audio player is detected (step 302). The auto-shutdown unit may make this determination by polling a status register in memory for a user interaction detected flag set by the user interaction detection unit. The user interaction detection unit triggers an interrupt when the user interacts with the audio player, such as when the user pushes a button on the player, which sets the flag in the status register. If a user interaction detected flag has been set in the status register which indicates that interaction between the user and the audio player is detected ('yes' output of step 302), the auto-shutdown unit resets the flag in the status register and resets the inactivity duration counter to the initial value (step 304). The process then loops back to step 302 to re-poll the status registers at specific intervals (e.g., every second).

Turning back to step 302, if the auto-shutdown unit determines that no interaction between the user and the audio player is detected ('no' output of step 302), the auto-shutdown unit then determines whether movement of the audio player is detected (step 306). The auto-shutdown unit may make this determination by polling a status register in memory for a flag set by the motion sensing unit. The motion sensing unit triggers an interrupt when any motion is detected by the motion sensor, which in turn sets a movement detected flag in the status register. If a movement detected flag has been set in the status register which indicates that movement of the audio player is detected ('yes' output of step 306), the auto-shutdown unit resets the flag in the status register and resets the inactivity duration counter to the initial value (step 304). The process then loops back to step 302 to re-poll the status registers at specific intervals.

Turning back to step 306, if the auto-shutdown unit determines that no movement of the audio player is detected ('no' output of step 306), the auto-shutdown unit increments the inactivity duration counter in the audio player to an incremented value (step 308). The auto-shutdown unit then makes a determination as to whether the incremented inactivity duration count value equals or exceeds a time duration threshold value (step 310). The time duration threshold value may be a default value or a value set by the user. If the current inactivity duration count value is less than the time duration threshold value ('no' output of step 310), the process loops back to step 302 to re-poll the status registers at specific intervals. However, if an incremented inactivity duration count value equals or exceeds the time duration threshold value ('yes' output of step 310), the auto-shutdown unit automatically shuts down the audio player to conserve battery life (step 312).

In one embodiment, the motion sensing unit is used as an override mechanism of an auto-shutdown feature of the user interaction detection unit by enabling the audio player to remain turned on even if no user interaction is detected by the user interaction detection device. As long as the motion sensing unit continues to detect movement of audio player, the auto-shutdown unit will not implement the auto-shutdown feature, as the audio player is determined to be still in use by the user. However, once a flag set by either the motion sensing unit or the user interaction detection unit indicates that no movement of the audio player or user interaction with the audio player has been detected within the set amount of time, the auto-shutdown unit automatically executes the auto-shutdown feature and turns off the audio player to conserve battery life.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for automatically controlling a power condition of a portable audio player, the computer implemented method comprising:
   polling a status register in a memory of the portable audio player;
   determining that a user is interacting with the portable audio player if a user interaction detected flag is set in the status register, wherein the user interaction detected flag is set in the status register by a first device in response to any user manipulation of an operation of the audio player including pushing a first button on the portable audio player to change a current song selection, pushing a second button on the portable audio player to change a volume level, and a voice based manipulation of the operation of the portable audio player;
   determining that the user is not interacting with the portable audio player if the user interaction detected flag is not set in the status register;
   responsive to a determination that the user is not interacting with the portable audio player, then determining using only a second device inside the portable audio player, whether the portable audio player is moving, wherein moving comprises a rotational motion of the portable audio player in at least two dimensions;
   responsive to a determination that the portable audio player is not moving, then incrementing an inactivity duration counter in the portable audio player to an incremented value; and
   responsive to a determination that the incremented value of the inactivity duration counter meets or exceeds a time duration threshold value, changing the power condition of the portable audio player by turning the portable audio player off, wherein the time duration threshold value is configurable by the user.

2. The computer implemented method of claim 1, further comprising:
   responsive to a determination that the user is interacting with the portable audio player or responsive to a determination that the portable audio player is moving, maintaining the power condition of the portable audio player.

3. The computer implemented method of claim 2, further comprising:
   responsive to maintaining the power condition of the portable audio player, repeating the determining and incrementing steps at configurable intervals.

4. The computer implemented method of claim 1, further comprising:
   responsive to a determination that the user interaction detected flag is set in the status register, resetting the inactivity duration counter and the user interaction detected flag in the status register.

5. The computer implemented method of claim 1, wherein the user interaction detected flag is set in the status register by an interrupt triggered when the user interacts with the portable audio player.

6. The computer implemented method of claim 1, wherein determining whether the portable audio player is moving further comprises:
   polling a status register in the portable audio player; and
   determining that the portable audio player is moving if a movement detected flag is set in the status register; and
   determining that the portable audio player is not moving if the movement detected flag is not set in the status register.

7. The computer implemented method of claim 6, further comprising:
   responsive to a determination that the movement detected flag is set in the status register, resetting the inactivity duration counter and the movement detected flag in the status register.

8. The computer implemented method of claim 6, wherein the movement detected flag is set in the status register by an interrupt triggered when a motion sensor in the portable audio player detects movement by the portable audio player.

9. The computer implemented method of claim 1, wherein the portable audio player comprises an auto-shutdown control, wherein a user selectively prevents the power condition of the portable audio player from being automatically turned off by setting the auto-shutdown control to disable, and wherein the user selectively allows the power condition of the portable audio player to be automatically turned off by setting the auto-shutdown control to enable.

10. A data processing system for automatically controlling a power condition of a portable audio player, the data processing system comprising:
    a bus in the portable audio player;
    a storage device, a processor, a memory, and a first device and a second device connected to the bus;
    a status register in the memory;
    program instructions stored in the storage device for execution by the processor via the memory for polling the status register in the memory of the portable audio player;
    program instructions stored in the storage device for execution by the processor via the memory for determining that a user is interacting with the portable audio player if a user interaction detected flag is set in the status register, wherein the user interaction detected flag is set in the status register by a first device in response to any user manipulation of the operation of the portable audio player including pushing a first button on the portable audio player to change a current song selection, pushing a second button on the portable audio player to change a volume level, and a voice based manipulation of the operation of the portable audio player;
    program instructions stored in the storage device for execution by the processor via the memory for determining that the user is not interacting with the portable audio player if the user interaction detected flag is not set in the status register;
    program instructions stored in the storage device for execution by the processor via the memory for responsive to a determination that the user is not interacting with the portable audio player, then determining using only a second device inside the portable audio player, whether the portable audio player is moving, wherein moving comprises a rotational motion of the portable audio player in at least two dimensions;
    program instructions stored in the storage device for execution by the processor via the memory for responsive to a determination that the portable audio player is not moving, then incrementing an inactivity duration counter in the portable audio player to an incremented value; and
    program instructions stored in the storage device for execution by the processor via the memory for responsive to a determination that the incremented value of the inactivity duration counter meets or exceeds a time duration threshold value, changing the power condition of the portable audio player by turning the portable audio player off, wherein the time duration threshold value is configurable by the user.

11. A computer program product for automatically controlling a power condition of a portable audio player, the computer program product comprising:

a computer usable storage device having computer usable program code tangibly embodied thereon, the computer usable program code comprising:

computer usable program code for polling a status register in a memory of the portable audio player;

computer usable program code for determining that a user is interacting with the portable audio player if a user interaction detected flag is set in the status register, wherein the user interaction detected flag is set in the status register by a first device in response to any user manipulation of an operation of the portable audio player including pushing a first button on the portable audio device to change a current song selection and pushing a second button on the portable audio player to change a volume level, and a voice based manipulation of the operation of the audio player; and computer usable program code for determining that the user is not interacting with the portable audio player if the user interaction detected flag is not set in the status register;

computer usable program code for responsive to a determination that the user is not interacting with the portable audio player, then determining using only a second device inside the portable audio player, whether the portable audio player is moving, wherein moving comprises a rotational motion of the portable audio player in at least two dimensions;

computer usable program code for responsive to a determination that the portable audio player is not moving, then incrementing an inactivity duration counter in the portable audio player to an incremented value; and computer usable program code for responsive to a determination that the incremented value of the inactivity duration counter meets or exceeds a time duration threshold value, changing the power condition of the portable audio player by turning the portable audio player off, wherein the time duration threshold value is configurable by the user.

12. The computer program product of claim 11, further comprising:

computer usable program code for maintaining the power condition of the portable audio player in response to a determination that the user is interacting with the portable audio player or responsive to a determination that the portable audio player is moving.

13. The computer program product of claim 12, further comprising:

computer usable program code for repeating the determining and incrementing steps at configurable intervals in response to maintaining the power condition of the portable audio player.

14. The computer program product of claim 11, wherein the computer usable program code for determining whether the portable audio player is moving further comprises:

computer usable program code for polling a status register in the portable audio player; and computer usable program code for determining that the portable audio player is moving if a movement detected flag is set in the status register; and computer usable program code for determining that the portable audio player is not moving if the movement detected flag is not set in the status register.

15. The computer program product of claim 14, wherein the movement detected flag is set in the status register by an interrupt triggered when a motion sensor in the portable audio player detects movement by the portable audio player.

* * * * *